United States Patent
Schroeder et al.

(10) Patent No.: US 7,737,947 B2
(45) Date of Patent: Jun. 15, 2010

(54) TRACKING MOTION USING AN INTERFERENCE PATTERN

(75) Inventors: Dale W. Schroeder, Scotts Valley, CA (US); Marshall T. DePue, San Mateo, CA (US); Ramakrishna Kakarala, Santa Clara, CA (US); Tong Xie, San Jose, CA (US); Gregory D. VanWiggeren, Los Gatos, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1120 days.

(21) Appl. No.: 10/687,431

(22) Filed: Oct. 16, 2003

(65) Prior Publication Data

US 2005/0083303 A1   Apr. 21, 2005

(51) Int. Cl.
 *G09G 5/08* (2006.01)
(52) U.S. Cl. ............................ 345/166; 345/179
(58) Field of Classification Search ......... 345/163–167, 345/179, 156–158; 250/237 R, 221
See application file for complete search history.

(56) References Cited

U.S. PATENT DOCUMENTS

| | | | | |
|---|---|---|---|---|
| 4,390,873 A | * | 6/1983 | Kirsch | ................ 345/166 |
| 4,409,479 A | * | 10/1983 | Sprague et al. | ......... 250/237 G |
| 4,546,347 A | * | 10/1985 | Kirsch | ................ 345/166 |
| 4,751,380 A | * | 6/1988 | Victor et al. | ................ 250/221 |
| 4,794,384 A | * | 12/1988 | Jackson | ................ 345/166 |
| 4,799,055 A | | 1/1989 | Nestler | |
| 4,984,287 A | * | 1/1991 | Massoudi | ................ 382/313 |
| 5,288,993 A | | 2/1994 | Bidiville et al. | |
| 5,463,387 A | | 10/1995 | Kato | |
| 5,793,357 A | | 8/1998 | Ivey et al. | |
| 6,201,233 B1 | | 3/2001 | Shiono | |

FOREIGN PATENT DOCUMENTS

| WO | WO-88/04087 | 6/1988 |
|---|---|---|
| WO | WO9946603 A1 | 9/1999 |

* cited by examiner

*Primary Examiner*—Regina Liang

(57) ABSTRACT

A system, method, and device for tracking motion across a surface by creating an interference pattern by reflecting light from the surface. There is produced, as a result of sensor moving across the surface, at least one signal pattern corresponding to a detection of a dimension of the interference pattern. This detected dimension is associated with an assumed dimensional value to determine a distance traveled by the sensor.

30 Claims, 3 Drawing Sheets

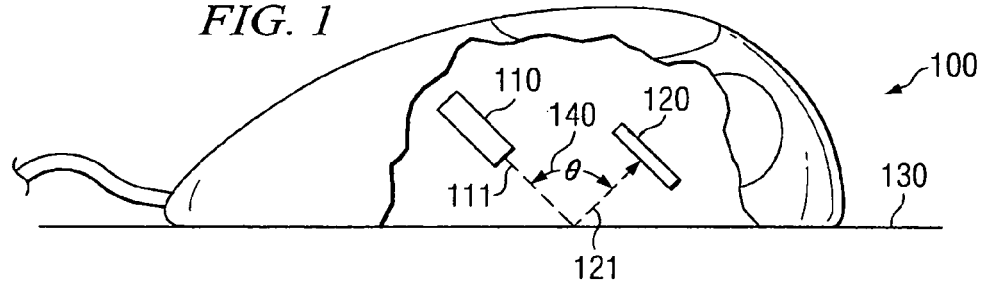
FIG. 1
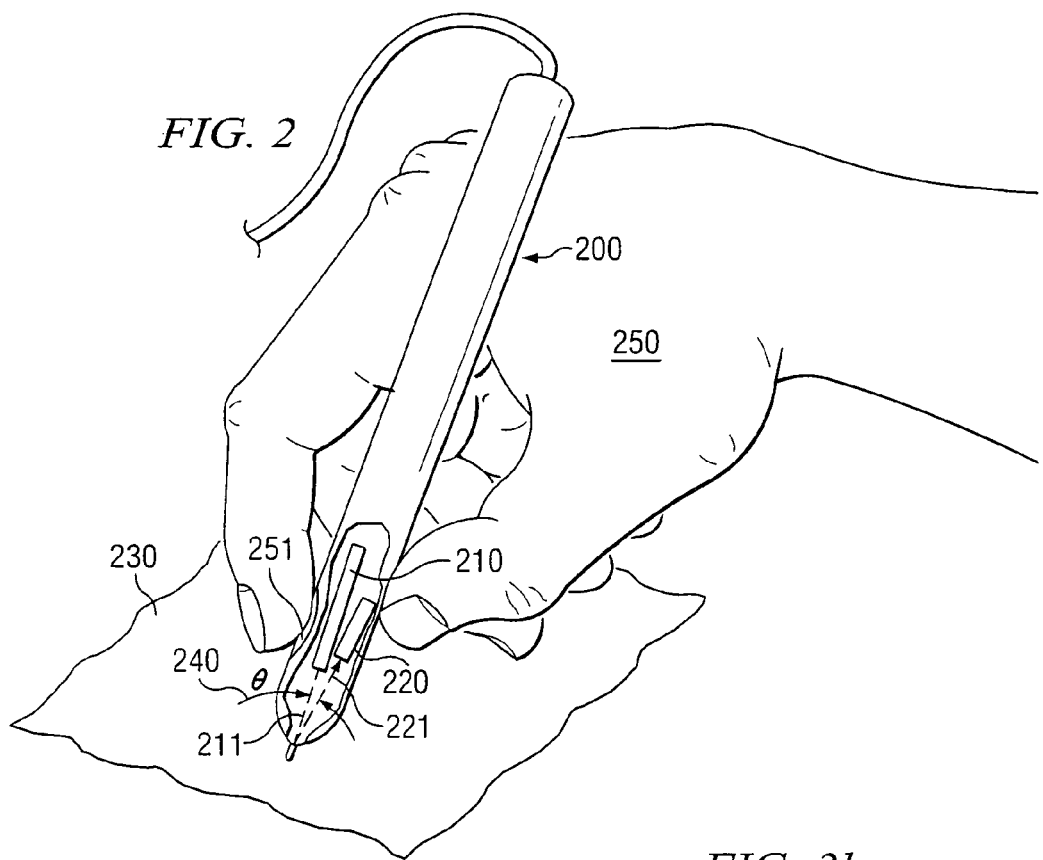
FIG. 2
FIG. 3a
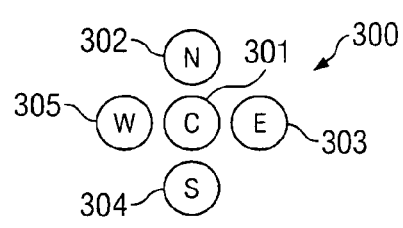
FIG. 3b
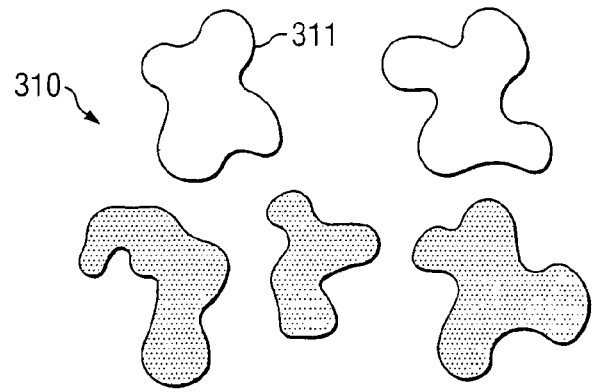

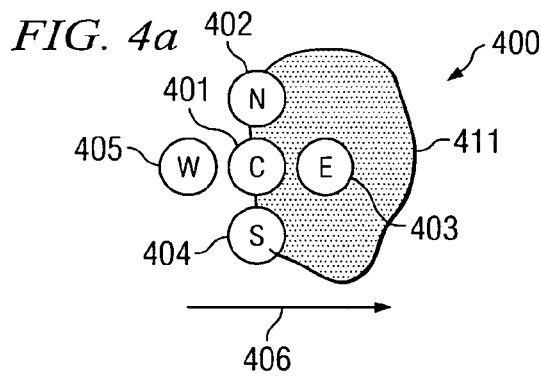
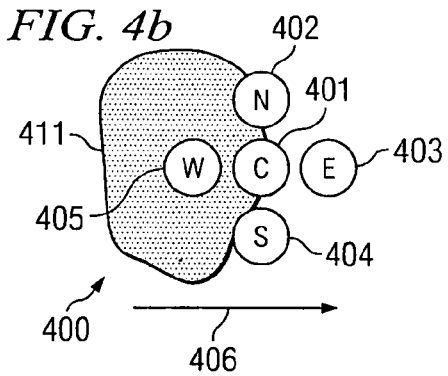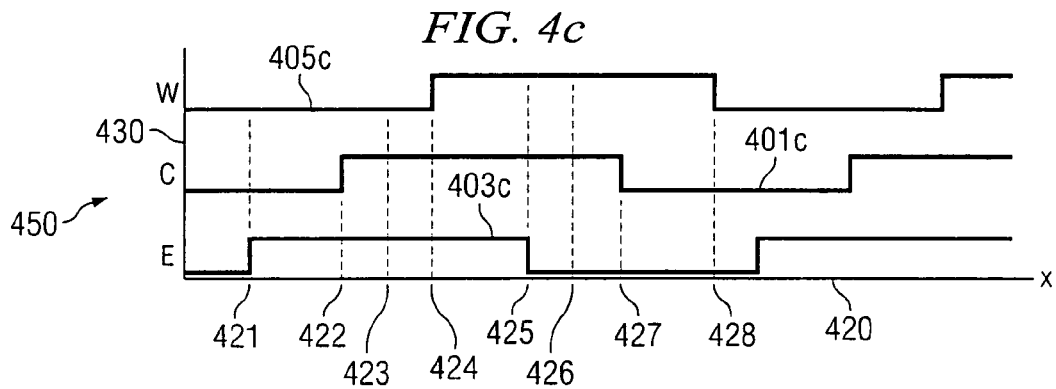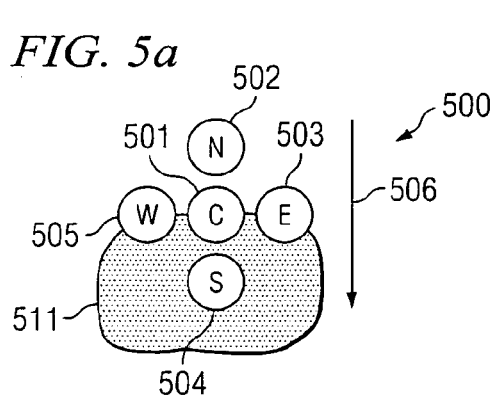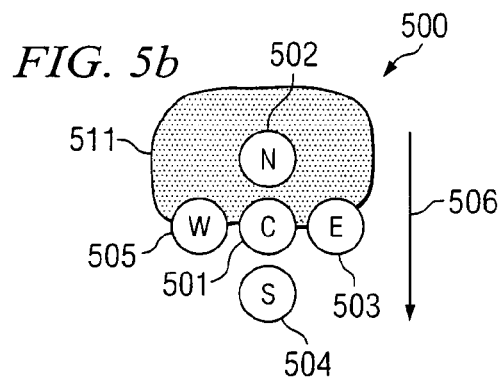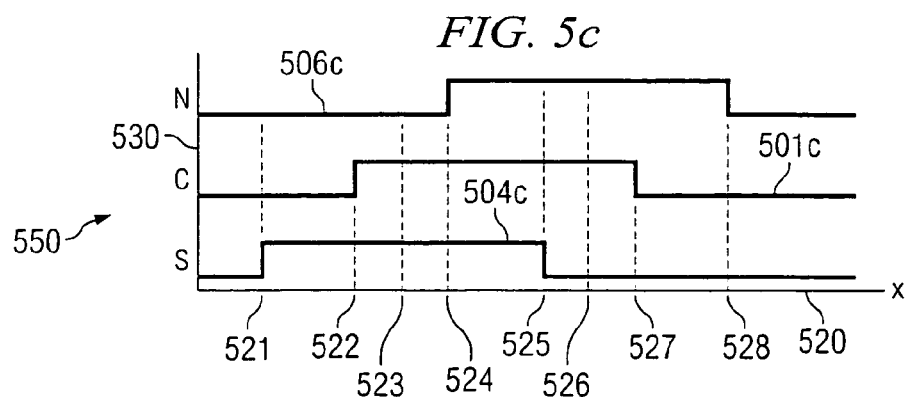

TRACKING MOTION USING AN INTERFERENCE PATTERN

TECHNICAL FIELD

This disclosure relates to motion tracking and more specifically to such motion tracking for use in a computer navigational device.

BACKGROUND OF THE INVENTION

The traditional computer navigational device uses an interior rolling ball to track its motion across a surface. The optical mouse was developed in response to problems with the common roller-ball mouse. An optical mouse does not have moving parts, but instead contains a sensor array arranged to take successive images of the surface supporting the mouse. Each image of the surface is compared to the proceeding image, and from this comparison a system can determine how far the mouse has moved. This system may not always operate effectively if the imaged surface is smooth.

Such devices use the constructive and destructive interference of the electromagnetic waves to form patterns of high and low intensity areas called speckle patterns. The contrast and size of these patterns may take various forms dependent upon, among other things, the coherency or lack of coherency of the electromagnetic waves as well as the arrangement of the device.

BRIEF SUMMARY OF THE INVENTION

Embodiments track motion across a surface by reflecting coherent light off of that surface to create an interference pattern. The interference patter is detected with at least one sensor to produce at least one signal corresponding to the detection of at least one dimension of an aspect of the interference pattern. The detected dimension is measured and from the measurement there is determined a distance traveled by the sensor. In one embodiment, the dimension is measured by correlation with an assumed value.

BRIEF DESCRIPTION OF THE DRAWINGS

FIGS. 1 and 2 are schematics illustrating embodiments of navigational devices;

FIG. 3a is a schematic illustrating one embodiment of a sensor arrangement;

FIG. 3b is a schematic illustrating one embodiment of an interference pattern;

FIGS. 4a and 4b are schematics illustrating an interaction of a sensor arrangement for horizontal motion detection;

FIG. 4c is a graph relating to sensor signals;

FIGS. 5a and 5b are schematics illustrating interactions of sensor arrangements for vertical motion detection;

FIG. 5c is a graph relating to sensor signals;

DETAILED DESCRIPTION OF THE INVENTION

Figure 6A:
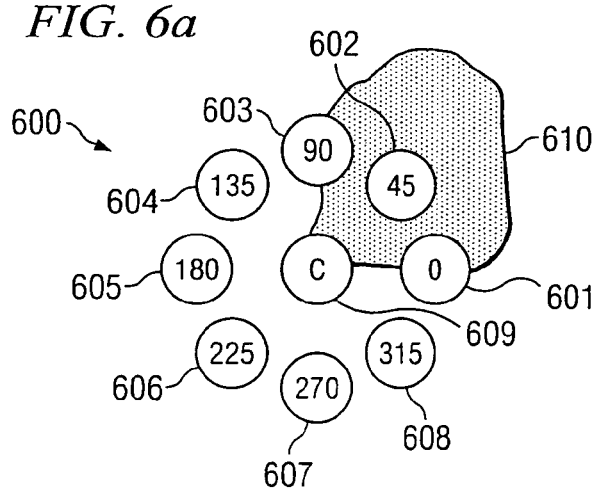
FIGS. 6a and 6b are schematics illustrating interactions of sensors arranged for polar coordinates.

FIGS. 1 and 2 show embodiments of computer navigational devices using electromagnetic waves (light) for sensing relative movement. The embodiments shown use a laser to emit coherent light that can be reflected off of a surface. The resulting interference pattern consists of a pattern of light and dark aspects, called speckles, when observed or detected. The dimensions of an individual speckle are primarily a function of certain device parameters, such as the wavelength of the incident light, the diameter of the laser beam, and the distance of the observer or the photo sensor from the reflecting surface. If the light parameters are held constant, an embodiment can anticipate that values for the dimensions of the formed speckles will to within a fixed Gaussian distribution where approximately 95% of the speckles are within 60% in size. Therefore, by holding the parameters constant, an embodiment can anticipate that 95% of the resulting speckles will have dimensions within some known range of values. If a large number of speckles are used, this consistency may be sufficient to enable a system to count the speckles as they pass and determine the distance of motion across a surface.

When the parameters of wavelength, laser diameter, and detector distance from surface are held constant, various embodiments may assume that each speckle width (or other appropriate pattern aspect dimension, such as speckle length, the distance between speckles, the distance between the front edge of two speckles, or the distance between the trailing edges of two speckles) is, in fact, the statistical average for that dimension as determined by the arrangement of the system. For average speckle size:

$$\text{Average Speckle Size} = \lambda \cdot \frac{R}{d} \qquad (1)$$

Where $\lambda$ is wavelength; R is distance from the reflection point; and d is diameter of the beam.

As equation (1) shows, the more tightly confined the laser beam used, the larger the speckles will be in the resulting pattern. Thus, it may be possible to create speckles with a predictable Gaussian average of between 50 to 100 microns in size. By equating the average value to the actual size of each speckle, it is possible to calculate the distance traveled by counting the number of speckles that have passed.

In the embodiment of FIG. 1, computer mouse 100 holds laser 110 and sensor cluster 120. Laser 110 emits coherent light 111 which reflects off of surface 130 producing interference phenomena, speckles 121. Laser 110 and sensor cluster 120 are held fixed with respect to each other, but the interference pattern 121 will move, with respect to sensor cluster 120, as computer mouse 100 moves across surface 130.

In the embodiment of FIG. 2, stylus 200 houses laser 210 and sensor cluster 220. In this embodiment, laser 210 projects coherent light 211 at an angle close to the radial axis of stylus 200 that reflects coherent light 211 off of a surface 230 to produce an interference pattern of speckles 221 which is then perceived by sensor cluster 220. In this example embodiment, the orientation of stylus 200 is important to the calculations. Thus, groove 251 is provided for the proper placement of the fingers of hand 250 as it grips stylus 200.

FIG. 3a is a diagram illustrating several aspects of one embodiment in relation to an interference phenomena, such as speckles produced by laser light reflecting off a surface. In FIG. 3a, sensor cluster 300 is arranged in accordance with one embodiment. Five sensors 301-305 are arranged in a cross pattern with sensor 301 at its center. Sensors 302, 303, 304 and 305 are then arranged on the points of a compass north, east, south, and west, respectively.

FIG. 3b shows interference pattern 310 composed of speckles, such as speckle 311. In the embodiment depicted, the speckles are designed to be approximately twice the size of sensors 301-305.

A typical optical mouse may have 250 or more fairly large sensors in order to accommodate the variation in surfaces a user may use. Sensors as small as 5 microns are currently available, which would result in an entire sensor array less than 50 microns across. If a sensor is used that is smaller than the speckles created, counting the speckles may be easier. By adjusting the distance of the sensors from the scattering surface, the speckle size can be varied, and a distance of 1 to 2 centimeters may be sufficient to produce speckles of 5 to 10 microns in size. Embodiments may use sensors with a diameter of 5 microns, and an average speckle size of approximately 10 microns. At this size, an embodiment could encounter approximately 2500 speckles per inch of movement.

In a sensor cluster, direction can be determined by the successive triggering of linked sensors. If only a single sensor is triggered by the presence of a speckle, no information can be gleaned regarding direction. If, however, a speckle triggers first one and then a second of a linked group of sensors, direction can be determined from the arrangement of the linked sensors. The north 302, center 301, and south 304 sensors of FIG. 3a are arranged in a vertical line. Embodiments may use a method of linking sensors in order to provide for the determination of direction. In FIG. 3a, if a speckle triggers north sensor 302, then center sensor 301, and then south sensor 304, a determination can be made that the speckle is traveling from the north to the south. The comparison of linked sensors can lead to a positive, negative, or zero direction state. Embodiments arranged such as in FIG. 3a can link the sensors in the vertical line and link the sensors in the horizontal line, and compare the signals of these linked sensors to determine direction states of +1, -1, or 0 along the vertical and the horizontal Cartesian axis.

Figure 7:
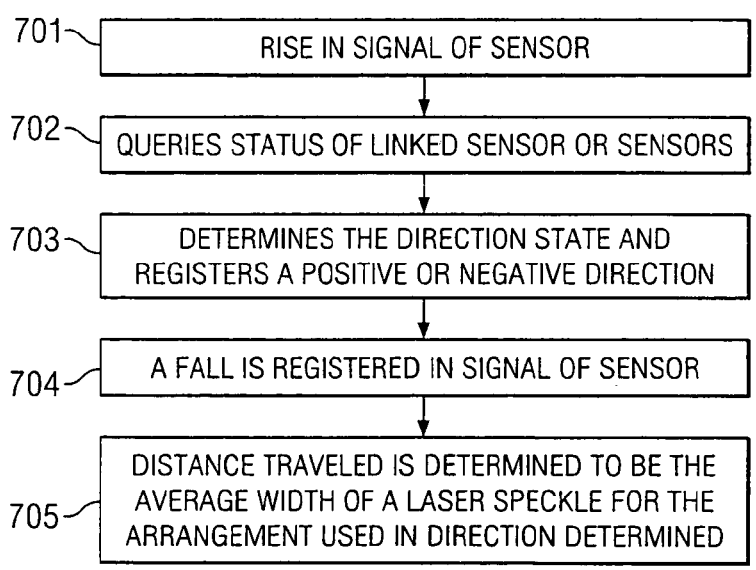
FIG. 7 is a flow diagram of one embodiment in accordance with the invention.

The embodiments may use the generalized method as illustrated in the flow diagram of FIG. 7. In step 701, a sensor of the sensor cluster detects the presence of a speckle creating a change (such as a rise) in the signal of the sensor. In step 702, an embodiment queries the signals of the linked sensors. In step 703, the system compares the signals of the linked sensors and determines a direction state of the sensor cluster from this comparison. In step 704, an embodiment may note that the signal of the original sensor indicates that the speckle is no longer being detected (a fall in the signal). In step 705, an embodiment would determine the distance traveled by correlating the rise and fall of the signal to the length of an average speckle, or other suitable dimension of the interference pattern. The embodiments are not limited to determining a distance from a measurement of the width of a speckle. Rather, any dimension of an interference pattern can be used if a suitable statistical average can be obtained.

FIGS. 4a, 4b, and 4c relate to example sensor cluster 400 as it interacts with speckle 411. In FIG. 4a sensor cluster 400 has moved one-quarter of the way over speckle 411. FIG. 4b depicts sensor cluster 400 having moved three-quarters of the way through speckle 411. FIG. 4c is a graphical depiction of signals 401c, 403c, and 405c of sensors 401, 403, and 405 as they move through the entire range of motion depicted in FIGS. 4a and 4b. As sensor cluster 400 moves in direction 406, east sensor 403 will be the first to detect speckle 411. In the graph of FIG. 4c, sensor 403's detection of speckle 411 is represented in signal 403c by signal rise 421. As sensor cluster 400 moves further through motion 406, speckle 411 will be detected by center sensor 401. In FIG. 4c, sensor 401's detection of speckle 411 is represented in signal 401c by signal rise 422. Continuing in direction 406, sensor 405 detects speckle 411 which registers as rise 424 on signal 405c of FIG. 4c. As speckle 411 passes out of range of sensor 403, signal 403c experiences signal drop 425. As cluster 400 passes further, speckle 411 will fall out of range of center sensor 401 resulting in signal drop 427 of 401c. When sensor cluster 400 has passed fully over speckle 411, sensor 405 will experience signal drop 428 in signal 405c. The point in direction 406 depicted by FIG. 4a is seen on graph 450 at point 423. The point in direction 406 depicted by FIG. 4b is seen on graph 450 at point 426.

FIGS. 5a, 5b, and 5c relate to the interaction of sensor cluster 500 with speckle 511 as sensor cluster 500 moves 506 across speckle 511. FIG. 5a depicts sensor cluster 500 as one-quarter of the way across speckle 511. FIG. 5b depicts sensor cluster 500 as it is moved three-quarters of the way across speckle 511. FIG. 5c graphically represents the signals 501c, 502c, and 504c generated by sensors 501, 502, and 504, as they pass completely across speckle 511. As cluster 500 moves in direction 506, southern sensor 504 will be the first to detect speckle 511, as seen by rise 521 of signal 504c. At the point in direction 506 where sensor cluster 500 has moved one-quarter of the way across speckle 511, as depicted in FIG. 5a, signals 504c and 501c have registered the presence of speckle 511 through rise 521 and rise 522. As motion continues in direction 506, detector 502 will detect speckle 511 as noted by signal rise 524. As sensor cluster 500 passes over speckle 511 and sensor 504 no longer detects speckle 511, signal 504c exhibits signal drop 525. The direction 506, as depicted in FIG. 5b, is illustrated graphically at point 526 of FIG. 5c where center sensor 501 still detects speckle 511 and northern sensor 502 also detects speckle 511. As motion in direction 506 continues, center sensor 501 will no longer detect speckle 511 resulting in signal drop 527 in signal 501c. As sensor cluster 500 passes completely over speckle 511, sensor 506 will not longer detect speckle 511 resulting in drop 528 of signal 506c.

To determine the direction of motion, embodiments can use a comparison of the signals of certain sensors. For the embodiment depicted in FIGS. 4a and 4b, direction along the horizontal axis may be determined by comparing the signals of sensors of 401, 403, and 405. To determine direction, the system may link each sensor with at least one of the other sensors and compare the signals to determine a direction state. For example, when signal 403c of eastern sensor 403 experiences a rise, 403c is compared to what is occurring in signal 401c of center sensor 401. If center sensor signal 401c is low, an embodiment would not register a direction and conclude a direction state of zero. If, however, signal 401c of center sensor 401 is high, an embodiment could determine that the sensor cluster was moving from east to west. When such a direction state occurs, an embodiment could then register a horizontal direction state of -1. Embodiments thus typically designed with a sensor one-half the size of the average speckle. With this ratio, and proper spacing of the sensors, a single speckle can be detected by two adjacent sensors at the same time.

If a rise is seen in signal 401c of the center sensor 401, an embodiment could then compare this signal to both signal 403c of eastern sensor 403 and signal 405c of western sensor 405. If a rise is seen in signal 401c of center sensor 401, and signal 403c of eastern sensor 403 is high while the signal 405c of western center 405 is low, the system can determine a direction state of +1 in the horizontal, meaning that sensor cluster 400 was moving from west to east. If a rise is seen in signal 405c of western sensor 405, an embodiment could compare signal 405c to signal 401c for center sensor 401. If signal 401c for center sensor 401 is low, this direction state would then register a zero. If signal 401c for center sensor 401 is high, then this direction sate would register a +1 indicating that the sensor cluster is moving from west to east. The following charts illustrate possible direction states for the horizontal motion of one embodiment.

CHART 1

Sensor E
If rise in signal of east sensor

| Linked sensor | Direction state |
|---|---|
| Signal 401 is low | 0 |
| Signal 401 is high | −1 |

CHART 2

Sensor C
If rise in signal of center sensor

| Linked sensors | Direction state |
|---|---|
| Signal 403 is low and signal 405 is high | −1 |
| Signal 405 is low and signal 403 is high | +1 |

CHART 3

Sensor W
If rise in signal of west sensor

| Linked sensors | Direction state |
|---|---|
| Signal 401 is low | 0 |
| Signal 401 is high | +1 |

In similar fashion, the present invention could also determine direction along the vertical direction by comparing signals 501c, 502c, and 504c of sensors 501, 502, and 504. Again, the method would link the signal of one sensor with the signal of at least one other sensor to determine direction states. For example, if signal 501c of center sensor 501 experiences a rise, a system of an embodiment could then compare signal 501c to signal 504c of southern sensor 504 and signal 502c of northern sensor 502. If, at this rise in signal 501c of the center sensor 501, signal 504c of southern sensor 504 is high and signal 502c of northern sensor 502 is low, sensor cluster 500 has a vertical direction state of −1, indicating that sensor cluster 500 is moving from north to south. If when center sensor signal 501c experiences a rise, northern sensor signal 502c is high and southern sensor signal 504c is low, the vertical direction state is a +1, indicating that sensor cluster 500 is moving from south to north.

Similar to detection of direction in the horizontal direction, a rise in the signals of the outside sensors 502 and 504 could trigger a comparison with signal 501c of the center sensor 501. If at the rise of signal 502c in northern sensor 502 center sensor signal 501c is low, sensor cluster 500 has a vertical direction state of zero and no direction is indicated. If, however, at the rise in signal 502c of northern sensor 502, signal 501c of center sensor is high, sensor cluster 500 would have a vertical direction state of −1, indicating that sensor cluster 500 is moving from north to south. When a rise is seen in signal 504c of southern sensor 504, the method could again compare signal 504c to signal 501c of center sensor 501 to determine direction state. If signal 501c of center sensor 501 is low at the rise of signal 504c of southern sensor 504, sensor cluster 500 has a vertical state of zero. If, however, signal 501c of center sensor 501 is high at the rise of signal 504c of southern sensor 504, this direction state would register a +1 indicating that sensor cluster 500 is moving from south to north.

Figure 6B:
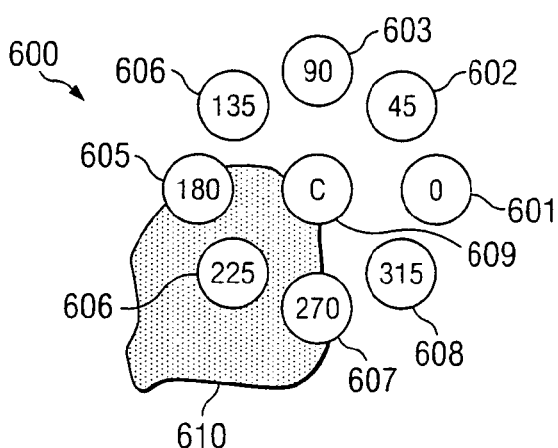

Previously discussed embodiments depict a sensor arrangement designed for direction determination in Cartesian coordinates. However, this is not the only possible arrangement, and the embodiments are not limited to an arrangements for the determining a direction in Cartesian coordinates. For example, a sensor cluster could be arranged to determine direction in polar coordinates, such as depicted in FIGS. 6a and 6b. Sensor cluster 600 is a circular arrangement of 8 sensors 601 through 608 with center sensor 609 at the approximate center of the circle described. As sensor cluster 600 interacts with speckle 610, the arrangement as depicted would be able to determine direction of motion 620 as an angle. For example, utilizing the method of linked sensors as described above, a rise in a signal of center sensor 601 could trigger a comparison of the signals of the other sensors. If, for example, sensor 602 was high and the signals of sensors 603-609 were low, the system could determine that sensor cluster 600 was moving at a 45° angle with a direction state of −1. Similar comparisons using the other sensors would result in different direction states registering different angles of direction. The arrangement of FIGS. 6a and 6b could then use a method of distance determination similar to that as already described, and thus motion is tracked.

What is claimed is:

1. A method for determining a first distance along a movement path on a surface over which an optical tracking device is moved by a user, comprising:

projecting, from a coherent light source, and along the movement path, a beam of coherent light as a first light beam incident on the surface;

generating, on the surface and along the movement path, a plurality of light interference speckles resulting from the first light beam and a second light beam representing at least portions of the first light beam reflected from the surface interfering with one another, the speckles having at least a first average spatial dimension;

sensing the plurality of speckles with a plurality of light sensors arranged in a sensor cluster as the optical tracking device is moved along the movement path, each of the light sensors having a second spatial dimension that is less than the first average spatial dimension of the speckles, each of the light sensors further being configured to generate a first signal when one of the plurality of speckles is disposed therebeneath and detected thereby and to generate a second signal when one of the plurality of speckles is not disposed therebeneath and not detected thereby, and determining, on the basis of the plurality of first and second signals, the first distance.

2. The method of claim 1, further comprising determining, on the basis of the first and second signals generated by the plurality of light sensors as the device is moved over the surface, a direction in which the optical tracking device moves along the movement path.

3. The method of claim 1, further comprising comparing the plurality of first and second signals to determine the first distance.

4. The method of claim 1, further comprising comparing the plurality of first and second signals to determine a direction in which the optical tracking device moves along the movement path.

5. The method of claim 1, further comprising sensing at least one characteristic of the speckles.

6. The method of claim 5, wherein the at least one characteristic is selected from the group consisting of speckle length, speckle width, speckle dimension, an edge of a speckle, a distance between speckles, a distance between leading edges of speckles, and a distance between trailing edges of speckles.

7. The method of claim 1, further comprising configuring the coherent light source and the plurality of light sensors such that the first average spatial dimension of the speckles may be predicted with a high degree of confidence.

8. The method of claim 1, further comprising configuring the coherent light source and the plurality of light sensors such that the first average spatial dimension of the speckles is given approximately by the equation:

$$\lambda \cdot (R/d),$$

where $\lambda$ is a wavelength of the light emitted by the coherent light source, R is a second distance the coherent light source is from the surface, and d is a diameter of the coherent light beam.

9. The method of claim 1, further comprising counting the number of speckles along the optical path to determine the first distance.

10. The method of claim 1, wherein the first average spatial dimension of the speckles is selected form the group consisting of about 10 microns and ranging between about 50 microns and about 100 microns.

11. The method of claim 1, wherein the plurality of light sensors comprises at least five light sensors.

12. The method of claim 1, the first signal is a high signal and the second signal is a low signal.

13. The method of claim 1, wherein the second signal is a high signal and the first signal is a low signal.

14. The method of claim 1, wherein the first average spatial dimension of the speckles is at least twice that of the second spatial dimension of the sensors.

15. A device for determining a first distance along a movement path on a surface over which an optical tracking device is moved by a user, comprising:
   a coherent light source configured to project a first coherent light beam along the movement path and onto the surface as an incident light beam, the coherent light source being configured in respect of the surface to produce a plurality of light interference speckles resulting from the first light beam and a second light representing at least portions of the first light beam reflected form the surface interfering with one another, the speckles having a first average spatial dimension;
   a plurality of light sensors arranged in a sensor cluster and operatively associated with the coherent light source and the processor, each of the plurality of light sensors having a second spatial dimension that is less than the first average spatial dimension of the speckles, each of the light sensors further being configured to generate a first signal when one of the plurality of speckles is detected thereby and to generate a second signal when one of the plurality of speckles is not detected thereby, and
   a processor configured to determine the first distance on the basis of the plurality of first and second signals generated by the plurality of light sensors as the device is moved over the surface.

16. The device of claim 15, wherein the processor is further configured to determine, on the basis of the plurality of first and second signals generated by the plurality of light sensors as the device is moved over the surface, a direction in which the optical tracking device moves along the movement path.

17. The device of claim 15, wherein the processor is further configured to compare the plurality of first and second output signals to determine at least one of the first distance and a first direction.

18. The device of claim 15, wherein the processor is further configured to determine at least one characteristic of the speckles.

19. The device of claim 18, wherein the at least one characteristic is selected from the group consisting of speckle length, speckle width, speckle dimensions, an edge of a speckle, distance between speckles, distance between leading edges of speckles, and distance between trailing edges of speckles.

20. The device of claim 15, wherein the coherent light source and the plurality of sensors are configured such that the first average spatial dimension of the speckles may be predicted with a high degree of confidence.

21. The device of claim 15, wherein the coherent light source and the plurality of sensors are configured such that the first average speckle dimension is given approximately by the equation:

$$\lambda \cdot (R/d),$$

where $\lambda$ is a wavelength of the light emitted by the coherent light source, R is a second distance the coherent light source is from the surface, and d is a diameter of the coherent light beam.

22. The device of claim 15, wherein the processor is further configured to count the number of speckles along the optical path to determine the first distance.

23. The device of claim 15, wherein the first average spatial dimension of the speckles is selected from the group consisting of about 10 microns and ranging between about 50 microns and about 100 microns.

24. The device of claim 15, wherein the plurality of light sensors comprises at least five light sensors.

25. The device of claim 15, wherein the first signal is a high signal and the second signal is a low signal.

26. The device of claim 15, wherein the second signal is a high signal and the first signal is a low signal.

27. The device of claim 15, wherein the processor is further configured to detect leading edges of the plurality of first and second signals generated by the plurality of light sensors.

28. The device of claim 15, wherein the processor is further configured to detect trailing edges of the plurality of first and second signals generated by the plurality of light sensors.

29. The device of claim 15, wherein the first average spatial dimension of the speckles is at least twice that of the second spatial dimension of the sensors.

30. The device of claim 15, wherein the device is a mouse.

* * * * *